US009286578B2

(12) United States Patent
Ritter et al.

(10) Patent No.: US 9,286,578 B2
(45) Date of Patent: Mar. 15, 2016

(54) DETERMINATION OF A MOST SUITABLE ADDRESS FOR A MASTER DATA OBJECT INSTANCE

(75) Inventors: Gerd M. Ritter, Heidelberg (DE); Andreas Bettin, Bad Schoenborn (DE); Andreas Neumann, St. Leon-Rot (DE); Toralf Grossmann, Nussloch (DE); Timo Wolf, Gaiberg (DE)

(73) Assignee: SAP SE, Walldorf (DE)

( * ) Notice: Subject to any disclaimer, the term of this patent is extended or adjusted under 35 U.S.C. 154(b) by 435 days.

(21) Appl. No.: 13/336,782

(22) Filed: Dec. 23, 2011

(65) Prior Publication Data
US 2013/0166499 A1 Jun. 27, 2013

(51) Int. Cl.
*G06F 17/30* (2006.01)
*G06Q 10/00* (2012.01)

(52) U.S. Cl.
CPC .......... *G06Q 10/00* (2013.01); *G06F 17/30088* (2013.01); *G06F 17/30507* (2013.01)

(58) Field of Classification Search
CPC .......... G06F 17/30371; G06F 11/3476; G06F 2201/84
USPC .............................. 705/1.1–500; 707/600–899
See application file for complete search history.

(56) References Cited

U.S. PATENT DOCUMENTS

| | | | |
|---|---|---|---|
| 6,374,241 B1 * | 4/2002 | Lamburt | G06F 17/30873 |
| 6,523,041 B1 | 2/2003 | Morgan et al. | |
| 6,529,904 B1 * | 3/2003 | Elsbernd et al. | |
| 7,099,878 B2 * | 8/2006 | Bruce et al. | |
| 7,254,573 B2 * | 8/2007 | Burke | |
| 7,565,376 B2 | 7/2009 | Stegmann et al. | |
| 7,624,340 B2 | 11/2009 | Ritter | |
| 7,630,969 B2 | 12/2009 | Ritter | |
| 7,680,783 B2 | 3/2010 | Ritter et al. | |
| 7,689,904 B2 | 3/2010 | Ritter | |
| 7,802,175 B2 | 9/2010 | Wagner et al. | |
| 7,966,566 B2 | 6/2011 | Ritter et al. | |
| 8,046,389 B2 | 10/2011 | Ritter | |
| 8,117,160 B1 * | 2/2012 | Tang | G06F 17/30088 707/639 |
| 8,402,237 B2 * | 3/2013 | Usgaonkar | G06F 3/0608 711/155 |
| 8,412,678 B2 * | 4/2013 | Wall et al. | 707/639 |
| 8,880,488 B1 * | 11/2014 | Xie | G06F 17/30374 707/704 |
| 2002/0138447 A1 | 9/2002 | Dutta | |
| 2005/0216444 A1 | 9/2005 | Ritter et al. | |
| 2005/0278302 A1 | 12/2005 | Ritter | |
| 2006/0015878 A1 | 1/2006 | Ritter | |
| 2006/0080338 A1 | 4/2006 | Seubert et al. | |
| 2006/0085336 A1 | 4/2006 | Seubert et al. | |

(Continued)

OTHER PUBLICATIONS

U.S. Appl. No. 12/980,170, filed Dec. 28, 2010, Ritter et al.

(Continued)

*Primary Examiner* — Michelle Owyang
(74) *Attorney, Agent, or Firm* — Fish & Richardson P.C.

(57) ABSTRACT

The present disclosure involves computer-implemented methods, software, and systems for determining a most suitable address for a master data object instance for a given usage in a business transaction document, master data object, or business process. A computer-implemented method includes determining, using at least one computer, an address determination sequence, applying the address determination sequence to available address instances of a master data object instance, identifying a most suitable address from among the available instances, and retrieving an address value from the identified most suitable address instance.

19 Claims, 7 Drawing Sheets

(56) References Cited

U.S. PATENT DOCUMENTS

| | | |
|---|---|---|
| 2006/0085450 A1 | 4/2006 | Seubert et al. |
| 2006/0149724 A1 | 7/2006 | Ritter et al. |
| 2006/0149725 A1 | 7/2006 | Ritter |
| 2006/0242210 A1* | 10/2006 | Ring et al. .................... 707/204 |
| 2007/0005915 A1* | 1/2007 | Thompson .......... G06F 11/1451 711/162 |
| 2007/0022081 A1 | 1/2007 | Ritter |
| 2007/0073890 A1 | 3/2007 | Ritter et al. |
| 2007/0143364 A1* | 6/2007 | Chen et al. .................... 707/203 |
| 2007/0208993 A1 | 9/2007 | Ritter |
| 2007/0209015 A1 | 9/2007 | Ritter |
| 2007/0233728 A1 | 10/2007 | Puteick et al. |
| 2008/0120129 A1 | 5/2008 | Seubert et al. |
| 2008/0154854 A1 | 6/2008 | Ritter |
| 2008/0154948 A1 | 6/2008 | Stegmann et al. |
| 2008/0255865 A1 | 10/2008 | Ritter et al. |
| 2009/0222493 A1 | 9/2009 | Smarr et al. |
| 2009/0259561 A1* | 10/2009 | Boys et al. ...................... 705/26 |
| 2010/0070317 A1 | 3/2010 | Pachter et al. |
| 2010/0070318 A1 | 3/2010 | Clemens et al. |
| 2010/0070337 A1 | 3/2010 | Poth et al. |
| 2010/0082497 A1 | 4/2010 | Biesemann et al. |
| 2011/0307263 A1 | 12/2011 | Bader et al. |
| 2011/0307363 A1 | 12/2011 | N et al. |

OTHER PUBLICATIONS

Office Action issued in U.S. Appl. No. 13/336,809 on Jun. 7, 2013; 14 pages.

Office Action issued in U.S. Appl. No. 13/336,809 on Oct. 10, 2013; 15 pages.

Office Action issued in U.S. Appl. No. 13/336,809 on May 2, 2014; 18 pages.

Notice of Allowance recvd in U.S. Appl. No. 13/336,809 on Aug. 29, 2014; 15 pages.

* cited by examiner

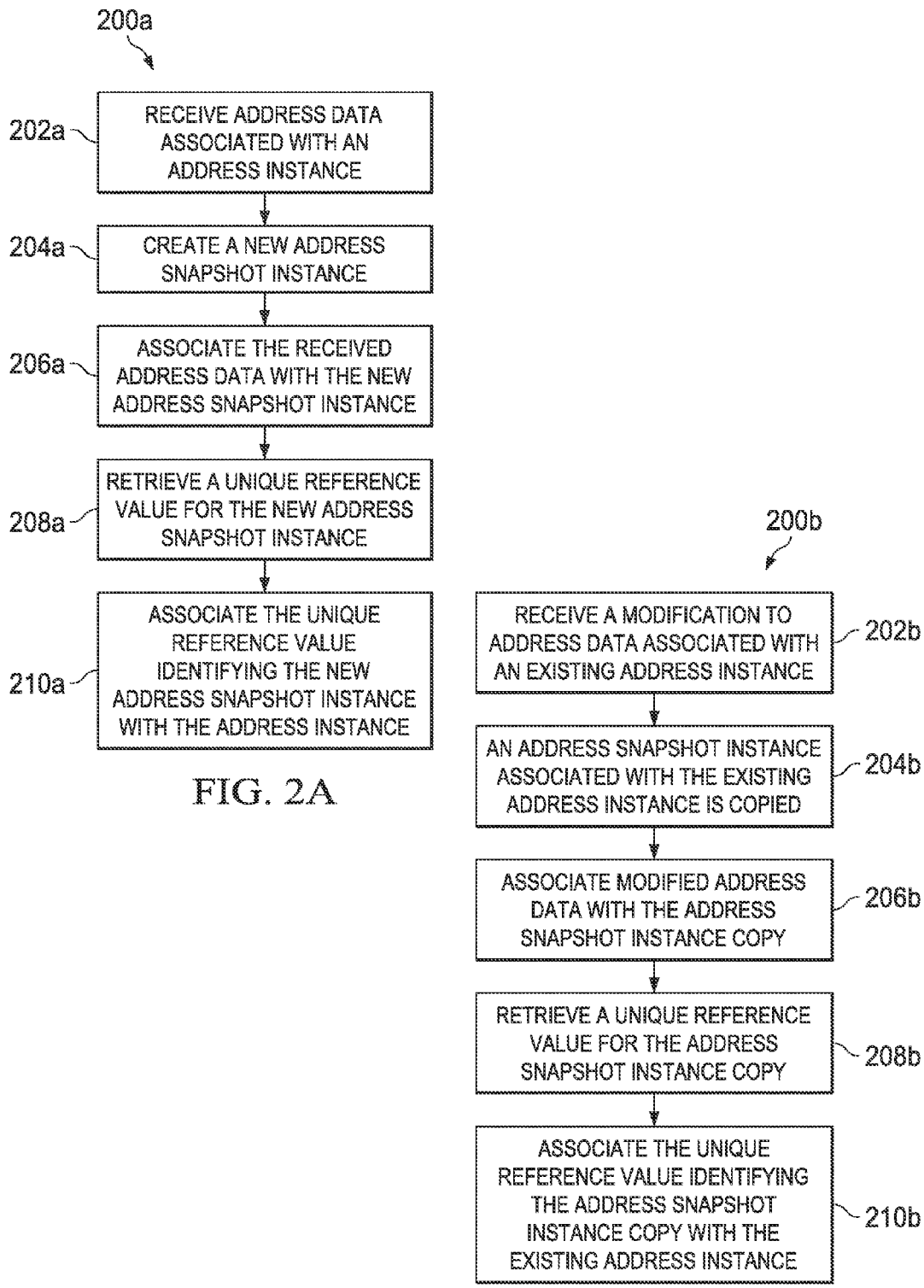

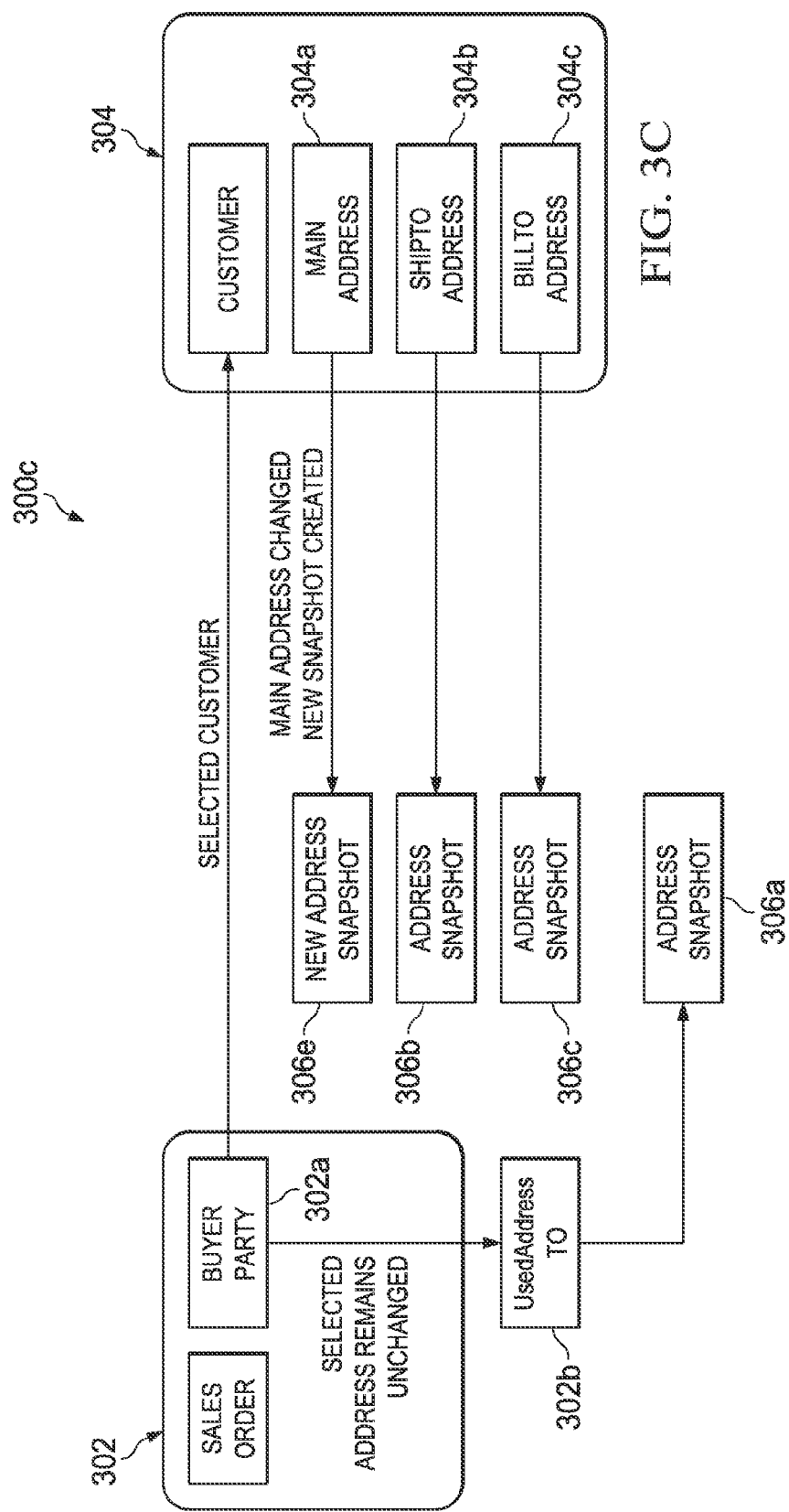

DETERMINATION OF A MOST SUITABLE ADDRESS FOR A MASTER DATA OBJECT INSTANCE

RELATED APPLICATIONS

This application is related to U.S. application Ser. No. 13/336,809, titled "EFFICIENT HANDLING OF ADDRESS DATA IN BUSINESS TRANSACTION DOCUMENTS," filed Dec. 23, 2011, and fully incorporating the contents therein.

TECHNICAL FIELD

The present disclosure relates to computer-implemented methods, software, and systems for determining a most suitable address of a master data object instance for a given usage in a business transaction document, master data object, or business process.

BACKGROUND

In an Enterprise Resource Planning (ERP) system, there may be multiple addresses associated with a particular master data object (MDO) instance. If an unsuitable address is proposed automatically with the particular MDO instance on creating business documents like sales orders, this results in, among other things, business inefficiencies, incorrect shipping and/or billing, domestic and/or international tax issues, and a waste of business resources. Furthermore, a user often has to manually change the address, which is inefficient. Correct determination of a most suitable address for the particular MDO instance is essential for efficient and cost-effective use and management of the particular MDO instance as well as to ensure data consistency in the ERP system.

SUMMARY

The present disclosure relates to computer-implemented methods, software, and systems for determining a most suitable address for a master data object instance for a given usage in a business transaction document, master data object, or business process. One computer-implemented method includes determining, using at least one computer, an address determination sequence, applying the address determination sequence to available address instances of a master data object instance, identifying a most suitable address from among the available instances, and retrieving an address value from the identified most suitable address instance.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 2A is a flowchart illustrating an example method for adding an address value in a business transaction document.

FIG. 2B is a flowchart illustrating an example method for changing an address value in a business transaction document.

FIGS. 3A-3C are block diagrams illustrating the use of an address snapshot with a business transaction document and a master data object.

Like reference numbers and designations in the various drawings indicate like elements.

DETAILED DESCRIPTION

Figure 1:
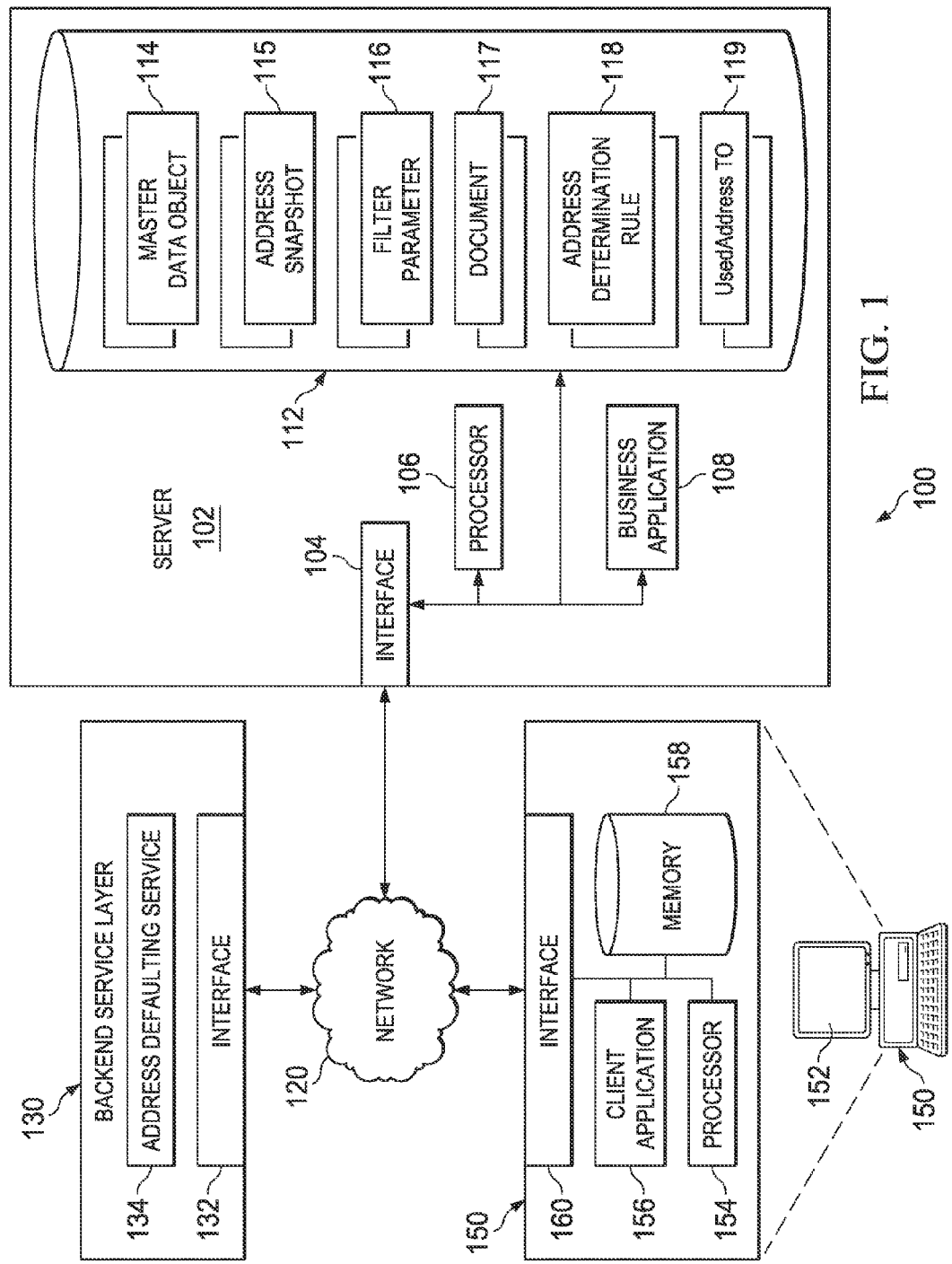
FIG. 1 illustrates an example system for determining a most suitable address for a master data object instance for a given usage in a business transaction document, master data object, or business process.

The disclosure generally describes computer-implemented methods, software, and systems for determining a most suitable address for a master data object (MDO) instance for a given usage in a business transaction document (BTD) like a sales order or another MDO. Specifically described are computer-implemented methods, software, and systems for determining the most suitable address from the MDO instance by providing context information to a service operating through a backend service layer in a service-oriented architecture (SOA).

Previously, in an enterprise resource planning (ERP) system, an unsuitable associated address was often chosen for a particular MDO instance to be used in a BTD. This was due to the lack of a centralized and/or generally available service to provide the most suitable address associated with the particular MDO instance used in the BTD. For example, an MDO instance describing an organization may have multiple associated addresses, such as, location address, ship-to address, ship-from address, bill-to address. Selecting an unsuitable address for the MDO instance, for example, selecting the ship-to address instead of the bill-to address when wishing to send an invoice to the organization may result in delayed payment for goods or services. Likewise, selecting the bill-to address instead of a ship-to address when shipping goods to the organization may result in incorrect calculation of tax, breach of a delivery contract, delayed production, etc. In addition, an incorrect default selection by the ERP system of an address to use in a BTD requires a user to manually change the address, an inefficient task. The advantages of the present disclosure are numerous. First, the disclosed computer-implemented methods, software, and systems allow automatic, rule-based determination of the most suitable address for the particular MDO instance in a particular usage. Second, compliance with domestic/international regulations and domestic/international tax laws are ensured. Further, billing and or shipping schedules are not affected by incorrectly selected address data. Finally, customer satisfaction is enhanced due to increased efficiency, for example, in not having to manually confirm and/or update BTD addresses. Other advantages will be apparent to those skilled in the art.

As used in the present disclosure, the term "structured data" is intended to encompass data organized into an identifiable structure. Examples of structured data may include a database, a business object (BO), and other suitable structured data. As used in the present disclosure, the term "unstructured data" is intended to encompass information that does not have a predefined data model and/or identifiable structure. Examples of unstructured data may include bitmap images, text, emails, and documents. Examples of documents may include text files, word processing files, web pages, sales orders, invoices, and other suitable unstructured data. As used in the present disclosure, a "unique reference value" may be a universal unique identifier (UUID), a global unique identifier (GUID), or other suitable unique identifier.

Turning to the figures, FIG. 1 illustrates an example environment 100 for supporting determination of a most suitable address for an MDO instance stored in ERP system in accordance with one implementation of the present disclosure. As used in the present disclosure, the term "address" is intended to encompass a physical location (e.g., GPS coordinates), mailing address, email address, email signature, phone number, name, fax number, Postal Box, user IDs (e.g., Facebook, Twitter) or other suitable location and/or contact information.

The illustrated environment 100 includes, or is communicably coupled with, a server 102, a network 120, a backend service layer 130, and a client 150. Environment 100 may represent an ERP system integrating internal and external management information across an entire organization and enabling the flow of information between all business functions inside boundaries of the organization and manages connections to outside stakeholders to the organization. The server 102, the backend service layer 130, and the client 150 may communicate across or via network 120. In general, example environment 100 depicts an example configuration of a system for determining a most suitable address for an MDO instance. In alternative implementations, the elements illustrated within the server 102, the backend service layer 130, and the client 150 may be included in or associated with different and/or additional servers, clients, networks, or locations other than those illustrated in FIG. 1. Additionally, the functionality associated with any component illustrated in example environment 100 may be associated with any suitable system, including by adding additional instructions, programs, applications, or other software to existing systems. For example, the components illustrated within the server 102 may be included in multiple servers, cloud-based networks, or other locations accessible, either directly or via network 120, to the server 102.

In general, the server 102 is any server that provides support for determining a most suitable address for an MDO instance via an address defaulting service 134 associated at least one MDO 114 instance, at least one address snapshot 115 instance, at least one filter 116, at least one document 117 instance, at least one address determination rule 118, and at least one UsedAddress transformed object (TO). Although illustrated as residing locally to server 102, the at least one MDO 114 instance, the at least one address snapshot 115 instance, the at least one filter 116, the at least one document 117 instance, the at least one address determination rule 118, and the at least one UsedAddress TO may reside either locally or remote to the server 102.

For example, each server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the server 102. In some implementations, each server 102 can store and execute a plurality of various other applications (not illustrated), while in other implementations, each server 102 may be a dedicated server meant to store and execute a particular business application 108 and its related functionality. In some implementations, the server 102 can comprise a Web server or be communicably coupled with a Web server, where the particular business application 108 associated with that server 102 represents a Web-based (or Web-accessible) application accessed and executed on an associated client 150 to perform the programmed tasks or operations of the corresponding business application 108. In still other instances, the business application 108 may be executed on a first system, while the business application 108 manipulates and/or provides information for data located at a remote, second system (not illustrated).

At a high level, the server 102 comprises an electronic computing device operable to receive, transmit, process, store, or manage data and information associated with the example environment 100. The server 102 illustrated in FIG. 1 can be responsible for receiving application requests from a client 150 (as well as any other entity or system interacting with the server 102), responding to the received requests by processing said requests in an associated business application 108 and sending the appropriate responses from the business application 108 back to the requesting client 150 or other requesting system. The business application 108 can also process and respond to local requests from a user locally accessing the associated server 102. Accordingly, in addition to requests from the external clients 150 illustrated in FIG. 1, requests associated with a particular business application 108 may also be sent from internal users, external or third-party customers, as well as any other appropriate entities, individuals, systems, or computers. In some implementations, the business application 108 can be a Web-based application executing functionality associated with the networked or cloud-based business process.

As used in the present disclosure, the term "computer" is intended to encompass any suitable processing device. For example, although FIG. 1 illustrates a single server 102, example environment 100 can be implemented using any number of servers, as well as computers other than servers, including a server pool. Indeed, the server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated server 102 may be adapted to execute any physical or virtual operating system, including Linux, UNIX, Windows, Mac OS, WebOS, iOS, Android, or any other suitable operating system.

In the illustrated implementation of FIG. 1, the server 102 includes an interface 104, a processor 106, a business application 108, and a memory 112. While illustrated as a single component in the example environment 100 of FIG. 1, alternative implementations may illustrate the server 102 as comprising multiple or duplicate parts or portions accordingly.

The interface 104 is used by the server 102 to communicate with other systems in a client-server or other distributed environment (including within example environment 100) connected to the network 120 (e.g., an associated client 150, as well as other systems communicably coupled to the network 120). FIG. 1 depicts both a server-client environment, but could also represent a cloud-computing network. Various other implementations of the illustrated example environment 100 can be provided to allow for increased flexibility in the underlying system, including multiple servers 102 performing or executing at least one additional or alternative implementation of the business application 108 In those implementations, the different servers 102 may communicate with each other via a cloud-based network or through the connections provided by network 120. Returning to the illustrated example environment 100, the interface 104 generally comprises logic encoded in software and/or hardware in a suitable combination and operable to communicate with the network 120. More specifically, the interface 104 may comprise software supporting at least one communication protocol associated with communications such that the network 120 or the interface's hardware is operable to communicate physical signals within and outside of the illustrated example environment 100.

Generally, the server 102 may be communicably coupled with a network 120 that facilitates wireless or wireline communications between the components of the example environment 100, that is the server 102, the backend service layer 130, and the client 150, as well as with any other local or remote computer, such as additional clients, servers, or other devices communicably coupled to network 120, including those not illustrated in FIG. 1. In the illustrated example environment 100, the network 120 is depicted as a single network, but may be comprised of more than one network without departing from the scope of this disclosure, so long as at least a portion of the network 120 may facilitate communications between senders and recipients. In some implementations, at least one component associated with the server 102 can be included within the network 120 as at least one cloud-based service or operation. The network 120 may be all or a portion of an enterprise or secured network, while in another implementation, at least a portion of the network 120 may represent a connection to the Internet. In some implementations, a portion of the network 120 can be a virtual private network (VPN). Further, all or a portion of the network 120 can comprise either a wireline or wireless link. Example wireless links may include cellular, 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated example environment 100. The network 120 may communicate, for example, Internet Protocol (IP) packets, Frame Relay frames, Asynchronous Transfer Mode (ATM) cells, voice, video, data, and other suitable information between network addresses. The network 120 may also include at least one local area network (LAN), radio access network (RAN), metropolitan area network (MAN), wide area network (WAN), all or a portion of the Internet, and/or any other communication system or systems in at least one location. The network 120, however, is not a required component in some implementations of the present disclosure.

As illustrated in FIG. 1, the server 102 includes a processor 106. Although illustrated as a single processor 106 in the server 102, two or more processors may be used in the server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the server 102 and, specifically, the functionality associated with the corresponding business application 108. In one implementation, the server 102 processor 106 executes the functionality required to also receive and respond to requests and instructions from the client 150.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, any suitable version of a 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the business application 108 stored on the associated server 102. In other implementations, a particular server 102 can be associated with the execution of two or more business applications 108 as well as at least one distributed application (not illustrated) executing across two or more servers 102.

At least one business application 108 is illustrated within the server 102. Although illustrated as a business application 108 in the server 102, two or more business applications 108 may be used in the server 102 according to particular needs, desires, or particular implementations of example environment 100. The business application 108 can be any application, program, module, process, or other software that may execute, change, delete, generate, or otherwise manage information associated with a particular server 102, and in some cases, a business process performing and executing business process-related events. In particular, business processes communicate with other users, applications, systems, and components to send and receive events. In some implementations, a particular business application 108 can operate in response to and in connection with at least one request received from an associated client 150. Additionally, a particular business application 108 may operate in response to and in connection with at least one request received from other business applications 108, including a business application 108 associated with another server 102. In some implementations, each business application 108 can represent a Web-based application accessed and executed by remote clients 150 via the network 120 (e.g., through the Internet, or via at least one cloud-based service associated with the business application 108). For example, a portion of a particular business application 108 may be a Web service associated with the business application 108 that is remotely called, while another portion of the business application 108 may be an interface object or agent bundled for processing at a remote client 150. Moreover, any or all of a particular business application 108 may be a child or sub-module of another software module or enterprise application (not illustrated) without departing from the scope of this disclosure. Still further, portions of the particular business application 108 may be executed or accessed by a user working directly at the server 102, as well as remotely at a corresponding client 150. In some implementations, the server 102 can execute the business application 108. In some implementations, the business application 108 can be executed via a client 150 accessing the business application 108.

The server 102 also includes a memory 112 for storing data and program instructions. The memory 112 may include any memory or database module and may take the form of volatile or non-volatile memory including, without limitation, magnetic media, optical media, random access memory (RAM), read-only memory (ROM), flash memory, removable media, or any other suitable local or remote memory component. The memory 112 may store various objects or data, including classes, frameworks, applications, backup data, business objects, jobs, Web pages, Web page templates, database tables, process contexts, repositories storing services local to the server 102, and any other appropriate information including any parameters, variables, database queries, algorithms, instructions, rules, constraints, or references thereto associated with the purposes of the server 102 and its business application 108. In some implementations, including a cloud-based system, some or all of the memory 112 can be stored remote from the server 102, and communicably coupled to the server 102 for usage. As illustrated in FIG. 1, memory 112 includes the at least one MDO 114 instance, the at least one address snapshot 115 instance, the at least one filter 116, the at least one document 117 instance, the at least one address determination rule 118, and the at least one UsedAddress TO.

The at least one MDO 114 instance may represent a business object (BO) defining core business entities used in applications across an organization. For example, traditional MDOs may describe customers, products, employees, vendors, parts, policies, activities, etc. Often, the core business entities described by master business objects are subjected to enterprise governance policies, along with their associated metadata, attributes, definitions, roles, connections and taxonomies. In some implementations, the at least one MDO 114 instance provides a low-level association from BO nodes, under which an address instance is stored, to an address snapshot 115 instance using a unique reference value. The low-level association returns the address snapshot 115 instance for the address instance valid at a given point in time. In some implementations, the given point in time is the present time. In other implantations, the given point in time may any other suitable point in time. In some implementations, an additional high-level "convenience association" from the root BO node of the at least one MDO 114 instance provides a SOA reuse service used to determine the most suitable address snapshot 115 instance associated with the convenience association. In some implementations, each BO node associated with the at least one MDO 114 instance will refer to one or more address snapshot 115 instances. In some implementations, the at least one MDO 114 instance creates a new address snapshot 115 instance whenever the address instance of the at least one MDO 114 instance changes or is newly created. In some implementations, the at least one MDO 114 instance is stored locally with the server 102. In other implementations, the at least one MDO 114 instance can be stored remotely from the server 102 as long as the at least MDO 114 instance is accessible by the server 102. The at least one MDO 114 instance may be accessed, for example, via a Web service, a remote access system or software, a local or remote client 150, the business application 108, or other suitable system component.

The at least one address snapshot 115 instance is modeled as a business object and serves as the only type of address data in BTDs, such as the at least one document 117 instance described below, and business objects, such as MDO 114 instance described above. Each address snapshot 115 instance represents an exact and immutable (i.e., read-only) copy of address data and may be associated from either an MDO 114 instance address instance or a document 117 instance address instance. In other words, the MDO 114 instance and the document 117 instance may each be associated with a particular address snapshot 115 instance independently, but the particular address snapshot instance is not exclusively associated with either the MDO 114 instance or the document 117 instance. In some implementations, at least one address data value stored in the at least one document 117 instance and/or stored in the at least one MDO 114 instance is replaced by a unique reference value identifying at least one address snapshot 115 instance. In other implementations, every address instance in the at least one document 117 instance and in the at least one MDO 114 instance can be replaced by a unique reference value identifying at least one address snapshot 115 instance. In some implementations, apart from the unique reference value identifying each address snapshot 115 instance, some or all data contained within different address snapshot 115 instances may be identical.

The address snapshot 115 instance does not need a lock object. Upon creation of a new address snapshot 115 instance, a new unique reference value is provided internally to identify the new address snapshot 115 instance. No other address snapshot can assume the same unique reference value. In some implementations, the unique reference value can be stored remotely from the new address snapshot 115 instance, for example in a data structure, a file, a database, etc. In some implementations, until the newly created address snapshot 115 instance is saved, changes are allowed. Once the newly created address snapshot 115 instance is saved, the newly created address snapshot 115 instance becomes immutable. In some implementations, deletion of address snapshot 115 instances are not permitted In some implementations, the at least one address snapshot 115 instance can be stored remotely from the server 102. The at least one address snapshot 115 instance may be accessed, for example, via a Web service, a remote access system or software, a local or remote client 150, the business application 108, or other suitable system component.

In some implementations, the at least one address snapshot 115 business object can be modeled as follows:
Node ROOT
The node Root contains the following fields:

| Name | Type | Description |
| --- | --- | --- |
| UUID | APC_V_UUID | The UUID of the AddressSnapShot |
| SOURCE_NODE_REFERENCE | APC_S_OBJECT_NODE_REFERENCE | The node hosting the address or address snapshot from which this instance was generated. |
| SOURCE_VALIDITY_PERIOD | APC_S_CLOSED_DATE_PERIOD | The validity period of the source object, for which the snapshot was generated. |

| Name | Type | Description |
|---|---|---|
| SYSTEM_ADMINISTRATIVE_DATA | APC_S_SYST_ADMINISTRATIVE_DATA | By whom and when the snapshot was created. |

SOURCE_NODE_REFERENCE contains
a) in the case where the address snapshot is taken from a MDO the reference to the master data address host node
b) in the case where the address snapshot is taken from another snapshot (e.g. in case a document address was modified) the reference to the root node of the precursor address snapshot root node.
c) in the case where the address snapshot was created from scratch (e.g. a newly created document address for an item that previously had no snapshot at all) the reference to its own root node.

Node POSTAL_ADDRESS

The node POSTAL_ADDRESS contains the data which is most important for many business processes.

Node OVERVIEW

The node Overview contains, among other fields, a single AddressSnapshotUUID field and a FormattedName field containing the contents of the field FormattedName in the node DisplayName.

Node DISPLAY_NAME

The BO AddressSnapshot contains the node DisplayName. . It contains the semantically name of an entity from an interior point of view. That name may differ from the name maintained in the node OrganisationName of DO Address, which is used for postal services mostly.

The information provided in this node is intended to serve for display purposes for all party and location instances in a BTD. It is a separate node because the content can differ from the content of the node Name, and it is filled in all snapshot instances. This way it is possible to use this information with a unique access path in the UI for all cases of party and location instances.

An example from the internal organisation structure could look like the following:
DisplayName-FormattedName: Department A
Name-Name-FirstLineName: Company Hugo
Name-Name-SecondLineName: Department A The node DISPLAY_NAME is language dependent and may contain one entry for each language. This language dependence is necessary to be able to model the fact that in the BO model of the BO OrganisationalCentre and its projections the name is language-dependent.

Time dependency, in particular of the name information, as e.g. in BO Organisational Centre or for Employees, is supported by BO AddressSnapshot by creating several BO instances for different time slices.

For snapshot instances that are generated out of master data BO instances, the DISPLAY_NAME is filled according to specific rules per master data BO.

For snapshot instances that are created from scratch as document-specific addresses, the DISPLAY_NAME is generated as concatenation of the first two elements of the node NAME.

For snapshot instances that are copied from master data snapshot instances, the DISPLAY_NAME is kept stable as long as there is no change to the elements of the node NAME. As soon as changes to the fields NAME-FIRST_LINE_NAME or NAME-SECOND_LINE_NAME in the node NAME are maintained—and the node DISPLAY_NAME is not maintained in the same MODIFY call—the DISPLAY_NAME will be generated as concatenation of the elements NAME-FIRST_LINE_NAME and NAME-SECOND_LINE_NAME of the node NAME.

The specific logic just described allows the following:
The DISPLAY_NAME is always read only on BTD UIs
The DISPLAY_NAME is correct if only an attribute of the postal address is changed on the UI Node NAME The BO Address Snapshot partly contains calculated content which gives a harmonized view on diverse attributes like name fields. In particular, the name fields relevant for address formatting will have a unique structure of four lines with Char40 each. The data type OrganisationName can be used for that purpose.

GDT OrganisationName:
FIRST_LINE_NAME
SECOND_LINE_NAME
THIRD_LINE_NAME
FOURTH_LINE_NAME Important information of the node NAME can occur in any of its fields due to its construction.

Transformation Node FORMATTED_ADDRESS

The attribute FormattedName is not derived from the contents of the node NAME but from the node DISPLAY_NAME.

Node COMMUNICATION_PREFERENCE

The node COMMUNICATION_ PREFERENCE in the BO AddressSnapshot only contains the field CorrespondenceLanguageCode.

Changeability of BO Address Snapshot instances

The intrinsic character of the BO Address Snapshot is that it describes address records for a certain point in time. Therefore the data shall not change over time, neither by later updates nor by explicit planning of time-dependent changes of the corresponding MDO. Deletion of instances of BO Address Snapshot may be possible if they are not used in BTDs.

Changes to the related address data of master data instances or BTD instances lead to new instances of the BO AddressSnapshot. All instances of BO AddressSnapshot are read-only (i.e., immutable) after the creation on the database.

In order to minimize the overhead during the creation process of a document specific address the BO Address Snapshot allows changes to an instance as long as this instance is not yet saved.

A special case is the update of the validity for address instances in master data BOs. Each instance of BO AddressSnapshot describes data valid for a time interval as it was known to the system at the time when the data was saved. For that purpose the node ROOT contains a VALIDITY_PERIOD. In case the validity of an address is changed in the master data BO, a new address snapshot instance is created. The validity in the old snapshot instance is not updated. This way it is possible to reproduce why the old snapshot had been chosen based on a date which falls in the old validity period but not in the new validity period. In addition, it is not necessary to deviate from the general read-only property of the saved BO AddressSnapshot instance.

Other implementations of the at least one address snapshot 115 business object within the scope of this disclosure are possible.

The at least one filter 116 may represent rules, criteria conditions, parameters, variables, algorithms, instructions, constraints, references, queries, and any other appropriate information provided by a user to determine a most suitable address for a MDO instance. For example, filter 116 may have as filter parameters a party role, a location role, or a validity date or any other suitable filter as would be understood by one skilled in the art. A party role, for example, may include whether a party is to ship to/from, bill to/from, a manufacturer or reseller, or other suitable party role in a document 117 instance. A location role, for example, may include where a broken machine is located that needs replacement parts, where a customer is located, or other suitable location role. A validity date may include data indicating that an address is only valid between two dates, after a specific date, before a specific date, or other suitable validity date. The at least one filter 116 may be accessed, for example, via a Web service, a remote access system or software, a local or remote client 150, the business application 108, or other suitable system component.

The at least one address determination rule 118 may represent criteria conditions, parameters, variables, algorithms, instructions, constraints, references, queries, and any other appropriate processing instruction followed to determine a most suitable address for an MDO instance. In some implementations, the at least one address determination rule 118 is followed in a predetermined, prioritized order. In other implementations, the at least one address determination rule 118 can be followed in a dynamically generated order. As described in greater detail below, knowledge of the proper sequence to follow the at least one address determination rule 118 is application knowledge related to business processes (not illustrated) of applications, such as, for example, business application 108. In some implementations, the at least one address determination rule 118 can be stored remotely from the server 102. The at least one address determination rule 118 may be accessed, for example, via a Web service, a remote access system or software, a local or remote client 150, the business application 108, or other suitable system component.

The at least one UsedAddress TO 119 simplifies the usage of address data and does not contain its own data. In one implementation, the at least one UsedAddress TO 119 provides functionality to create new address snapshot 115 instances on at least the addition of an address instance to the document 117 instance and modification of an address instance in the document 117 instance once the changes to the document 117 instance are saved. This allows a user to make several changes to the document 117 instance before a new snapshot 115 instance may be created. In this implementation, the at least one UsedAddress TO 119 would update the document 117 instance added/modified address instance to "point" to the newly created address snapshot 115 instance once. As an address snapshot 115 instance is immutable, when a new address snapshot 115 instance is created, the old address snapshot 115 instance remains and may be referred to by the same or other MDOs and/or documents. In some implementations, the at least one UsedAddress TO 119 buffers changes until the user saves changes to the document 117 instance and then triggers a database commit due to the changes. In this implementation, once the database commit is triggered, a new address snapshot 115 instance is created by the at least one UsedAddress TO 119, unchanged data from a prior address snapshot 115 instance is copied to the new address snapshot 115 instance by the at least one UsedAddress TO 119, the user's applicable address changes to the document 117 instance are applied to the new address snapshot 115 instance by the at least one UsedAddress TO 119, and the reference from the reference from the document 117 instance address instance is updated by the at least one UsedAddress TO 119 to reflect the new address snapshot 115 instance.

In some implementations, each address instance in the document 117 instance will refer to an address snapshot 115 instance. In some implementations, the at least one document 117 instance can be stored remotely from the server 102. The at least one document 117 instance may be accessed, for example, via a Web service, a remote access system or software, a local or remote client 150, the business application 108, or other suitable system component.

The SOA backend service layer 130 provides software services to example environment 100. The business functionality of the ERP system may be accessible for all service consumers via this service layer. The software services, such as illustrated address defaulting service 134, provide reusable, defined business functionalities through a defined interface. For example, the interface, such as interface 132, may be software written in extensible markup language (XML) or other suitable language. While illustrated as a stand-alone component in the example environment 100 of FIG. 1, alternative implementations may illustrate the backend service layer 130 as integrated with other components of example environment 100. Moreover, any or all parts of the backend service layer 130 may be implemented as child or sub-modules of another software module or enterprise application (not illustrated) or of another hardware module (not illustrated) without departing from the scope of this disclosure.

The address defaulting service 134 provides the most suitable address for a particular MDO 114 instance using at least one filter 116. In some implementations the address defaulting service 134 can be a Web service. For example, the address defaulting service 134 can provide methods for business application 108 or other software component (not illustrated) to determine the most suitable address for a MDO 114 instance via a local/remote client 150 or other suitable hardware and/or software components (not illustrated) using the Internet and a Web browser application. While illustrated as a stand-alone component in the backend service layer 130, alternative implementations may illustrate the address defaulting service 134 as integrated with other components of example environment 100. Moreover, any or all parts of the address defaulting service 134 may be implemented as child or sub-modules of another software module or enterprise application (not illustrated) or of another hardware module (not illustrated) without departing from the scope of this disclosure.

In general, a client 150 is any computer device operable to connect or communicate with server 102 using a wireless or wireline connection (i.e., network 120). In particular, the client 150 may be embodied as a mobile or non-mobile computing device. At a high level, each client 150 can include a processor 154, a GUI 152, a client application 156, a memory 158, and an interface 160. In general, the client 150 comprises an electronic computer device operable to receive, transmit, process, and/or store any appropriate data associated with a server 102 or other suitable data source.

The GUI 152 of the client 150 is operable to allow the user of the client 150 to interface with at least a portion of the system 100 for any suitable purpose, including to allow a user of the client 150 to interact with at least one client application 156 and business application 108. In particular, the GUI 152 may provide users of the client 150 with a visualized representation of the client application 156, business application 108, and other client 150 functionality. The GUI 152 may include a plurality of user interface elements such as interactive fields, pull-down lists, buttons, and other suitable user interface elements operable at the client 150.

In some implementations, processor 154 can be similar to processor 106 of the server 102. In other implementations, the processor 154 may be a processor designed specifically for use in client 150. Further, although illustrated as a single processor 154, the processor 154 may be implemented as multiple processors in the client 150. Regardless of the type and number, the processor 154 executes instructions and manipulates data to perform the operations of the client 150, including operations to receive and process information from the server 102 or other suitable data source, access data within memory 158, execute the client application 156, as well as perform other operations associated with the client 150.

The client application 156 of the client 150 may retrieve application-related information from a corresponding server 102, or the client application 156 may access a local cached set of client-application-related information (not illustrated) stored on the client 150. In some implementations, the client application 156 can be a Web browser. In some implementations, the client-application 156 can use parameters, metadata, and other information received at launch to access a particular set of data from the server 102. Once a particular client application 156 is launched, a user may interactively process a task, event, or other information associated with the server 102. Further, although illustrated as a single client application 156, the client application 156 may be implemented as multiple client applications in the client 150.

Similarly, memory 158 of the client 150 may include any memory or database module and may take the form of volatile or non-volatile memory including, without limitation, magnetic media, optical media, random access memory (RAM), read-only memory (ROM), removable media, or any other suitable local or remote memory component. For example, memory 158 may store a client application 156, backup data, parameters, cookies, variables, algorithms, instruction, rules, or reference thereto. As illustrated, memory 158 can include any suitable components to interpret and decode messages received at the client 150. Further, although illustrated as a single memory 158, the memory 158 may be implemented as multiple memories in the client 150. Although not illustrated, the memory 158 may also store one or more of at least one master data object 114 instance, at least one address snapshot 115 instance, at least one filter 116, at least one document 117 instance, the at least one address determination rule 118, and the at least one UsedAddress TO similar to their analogous counterparts stored in memory 112.

The interface 160 of the client 150 may be similar to the interface 104 of the server 102, in that it may comprise logic encoded in software and/or hardware in a suitable combination and operable to communicate with the network 120. More specifically, interface 160 may comprise software supporting at least one communication protocol such that the network 120 or hardware is operable to communicate physical signals to and from the client 150. Further, although illustrated as a single interface 160, the interface 160 may be implemented as multiple interfaces in the client 150.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

Efficient Handling of Address Data in Business Transaction Documents

FIG. 2A is a flowchart illustrating an example method performed by a service for adding an address value in a BTD. In some implementations, the method of FIG. 2A is performed, at least partially, by a UsedAddress TO. For clarity of presentation, the description that follows generally describes method 200a in the context of FIG. 1. However, it will be understood that method 200a may be performed, for example, by any other suitable system, environment, software, and hardware, or a combination of systems, environments, software, and hardware as appropriate.

Referring now to FIG. 2A, method 200a begins at 202a. At 202a, address data associated with an address instance in a BTD instance is received. In some implementations, the address instance may be created upon receipt of address data. From 202a, method 200a proceeds to 204a.

At 204a, a new address snapshot instance is created. From 204a, method 200a proceeds to 206a.

At 206a, the received address data is associated with the newly created address snapshot instance. In some implementations, the new address data is written to an address instance within the newly created address snapshot instance. In other instances the new address data can be stored remotely from the newly created address snapshot instance, for example within a data structure, a file, a database, etc. From 206a, method 200a proceeds to 208a.

At 208a, a unique reference value for the newly created address snapshot instance is retrieved. In some implementations, the unique reference value for the newly created address snapshot instance is retrieved from the newly created address snapshot instance. In other implementations, the unique reference value for the newly created address snapshot instance is retrieved from a location remote to the newly created address snapshot instance, for example within a data structure, a file, a database, etc. From 208a, method 200a proceeds to 210a.

At 210a, the unique reference value identifying the newly created address snapshot instance is associated with the new address instance of the BTD instance. In some implementations, the unique reference value is written to the new address instance within the BTD instance. In other instances the unique reference value can be stored remotely from the new address instance, for example within a data structure, a file, a database, etc. From 210a, method 200a stops.

FIG. 2B is a flowchart illustrating an example method for changing an address value in a BTD instance. In some implementations, the method of FIG. 2B is performed, at least partially, by a UsedAddress TO. For clarity of presentation, the description that follows generally describes method 200b in the context of FIG. 1. However, it will be understood that method 200b may be performed, for example, by any other suitable system, environment, software, and hardware, or a combination of systems, environments, software, and hardware as appropriate.

Referring now to FIG. 2B, method 200b begins at 202b. At 202b, a modification to address data associated with a BTD instance address instance is received. From 202b, method 200b proceeds to 204b.

At 204b, a address snapshot instance associated with the existing address instance is copied. From 204b, method 200b proceeds to 206b.

At 206b, the modified address data is associated with the address snapshot instance copy. In some implementations, the changed address data is written to the address snapshot instance copy. In other instances the changed address data can be stored remotely from the address snapshot instance copy, for example within a data structure, a file, a database, etc. From 206b, method 200b proceeds to 208b.

At 208b, a unique reference value for the address snapshot instance copy is retrieved. In some implementations, the unique reference value for the address snapshot instance copy is retrieved from the address snapshot instance copy. In other implementations, the unique reference value for the address snapshot instance copy is retrieved from a location remote to the address snapshot instance copy, for example within a data structure, a file, a database, etc. From 208b, method 200b proceeds to 210b.

At 210b, the unique reference value identifying the address snapshot instance copy is associated with the existing address instance of the BTD instance. In some implementations, the unique reference value is written to the existing address instance within the BTD instance. In other instances the unique reference value can be stored remotely from the existing address instance, for example within a data structure, a file, a database, etc. From 210b, method 200b stops.

Figure 3A:
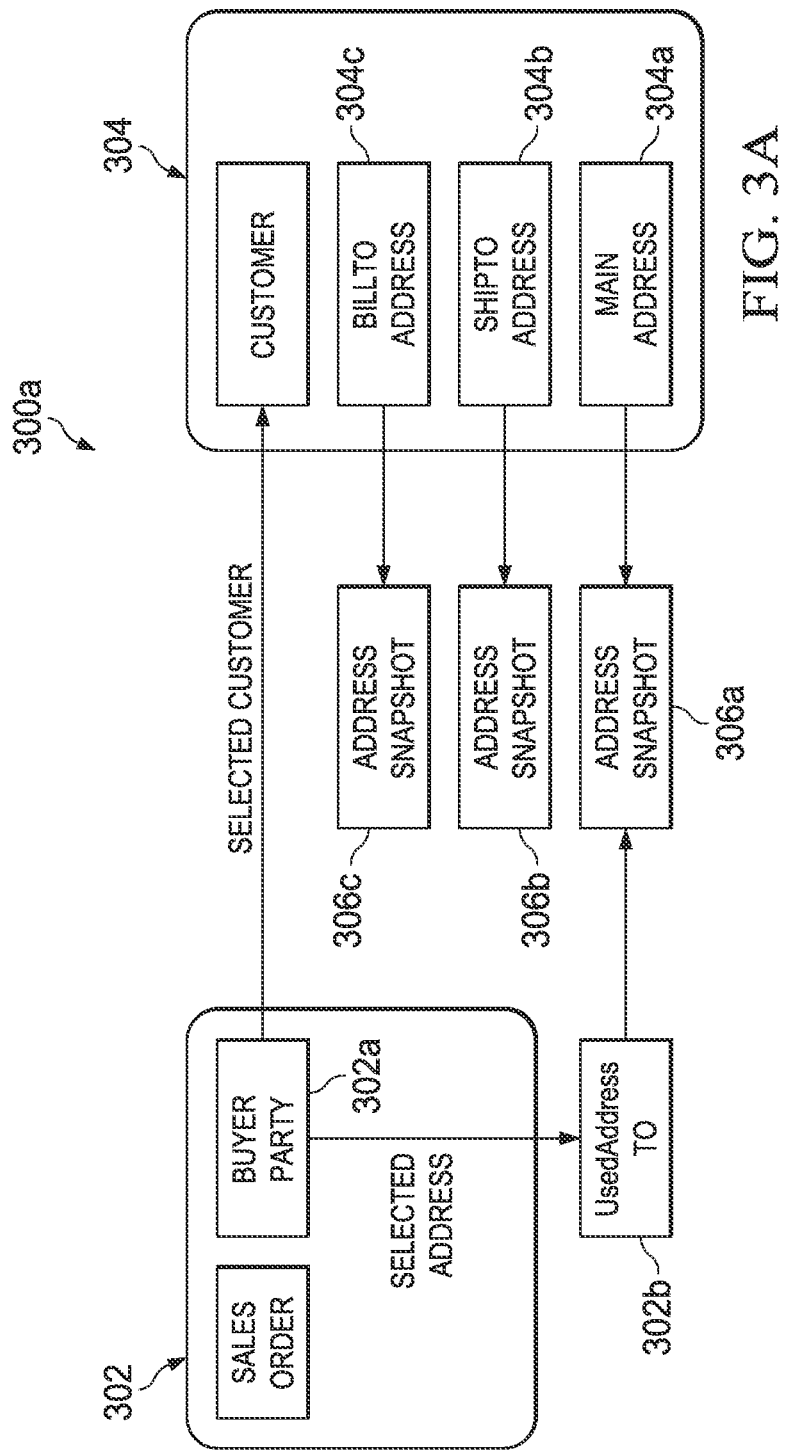
Figure 3B:
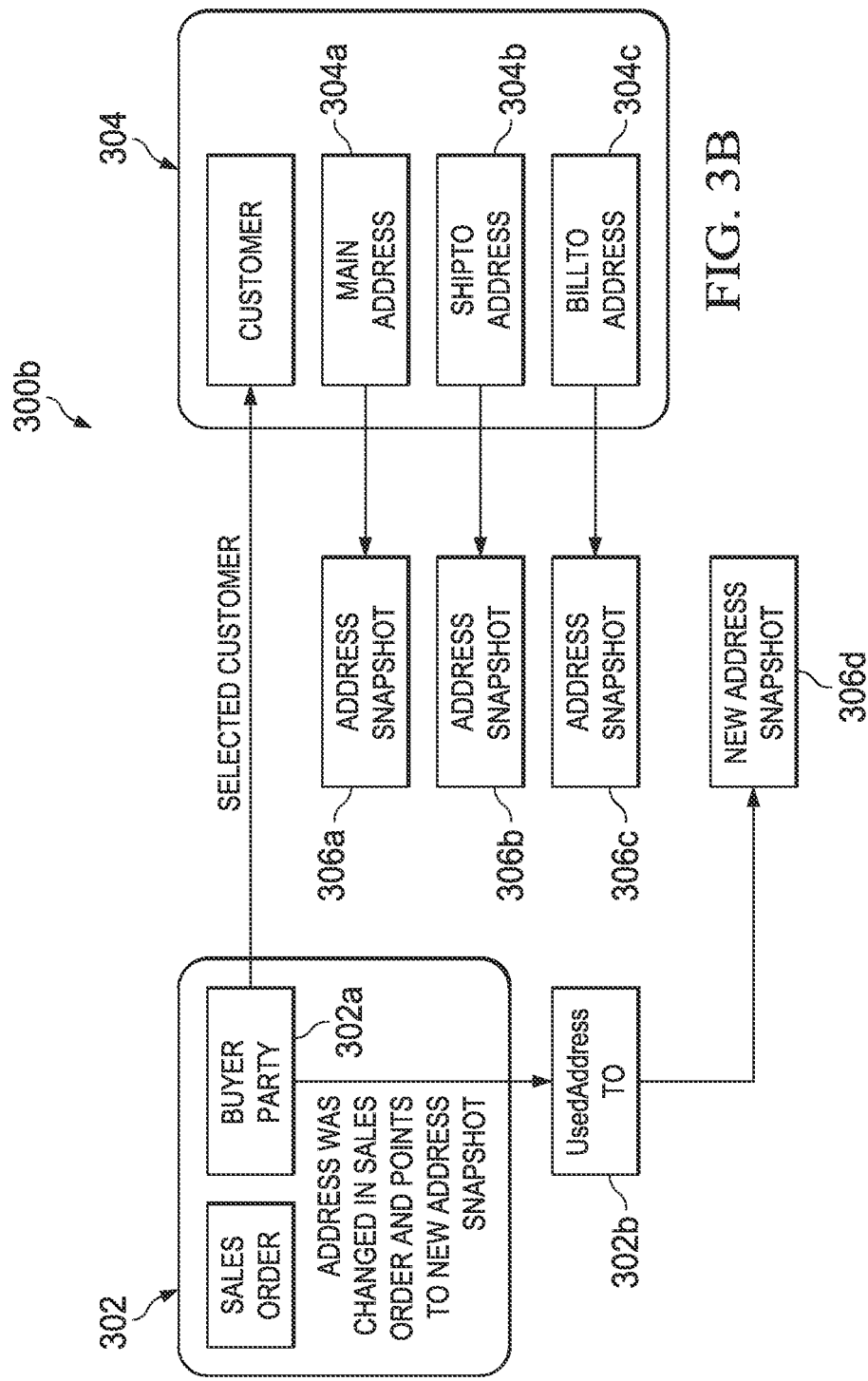

FIGS. 3A-3C are block diagrams illustrating the use of an address snapshot with a BTD instance and an MDO instance to efficiently handle address data in the BTD.

Referring now to FIG. 3A, FIG. 3A illustrates an example BTD instance, a sales order 302, after a buyer party has been added to the sales order 302, an example MDO instance, here customer 304, a UsedAddress TO 302b, and three address snapshot 306a-306c instances. Sales order 302 is illustrated as having a buyer party address instance 302a associated with a UsedAddress TO 302b. Customer 304 is illustrated as having a main address instance 304a, a ship-to address instance 304b, and a bill-to address instance 304c. In this example, the buyer party address instance 302a is shown referring to customer 304 (i.e., the buyer) and also referring to a selected address snapshot 306a instance (i.e., containing the main address of customer 304) using a UsedAddress TO 302b. Main address instance 304a is shown referring to address snapshot 306a instance, ship-to address instance 304b is shown referring to address snapshot 304b instance, and the bill-to address instance 304c is shown referring to address snapshot 306c instance. In other words, address snapshot 306a instance contains address data corresponding to the main address of customer 304, address snapshot 306b instance contains address data corresponding to the ship-to address for customer 304, and address snapshot 306c instance contains address data corresponding to the bill-to address for customer 304.

Referring now to FIG. 3B, FIG. 3B illustrates a change to the address data in the buyer party address instance 302a, for example, a ZIP code. In this example, a new address snapshot 306d instance is created by a UsedAddress TO 302b. The new address snapshot 306d instance contains the modified address data, here the same data as originally contained in the address snapshot 306a instance except for the changed ZIP code data. The address buyer party address instance 302a is changed from referencing the address snapshot 306a instance and to the newly created address snapshot 306d instance by a UsedAddress TO 302b. Once the sales order document has been saved, the newly created address snapshot 306d instance becomes immutable. Note that the main address instance 304a of customer 304 still refers to address snapshot 306a instance and the address data contained within address snapshot 306a has not been changed.

Referring now to FIG. 3C, FIG. 3C alternately illustrates a change to the address data in the main address instance 304a of customer 304 instead of a change to the address data in the buyer party address instance 302a. In this example, a new address snapshot 306e is created by the customer 304 MDO instance. Once the change to the customer business object 304 has been saved, the newly created address snapshot 306e instance becomes immutable. Note that the buyer party address instance 302a of sales order 302 still refers to address snapshot 306a instance and the address data contained within address snapshot 306a instance has not been changed.

Determining a Most Suitable Address for a Master Data Object Instance

In an ERP system with a backend service layer conforming to an SOA, the business functionality of the system is accessible for all service consumers via this service layer. If a service consumer wants to determine the most suitable address for a particular MDO instance referred to by a BTD, the user may: 1) enter or select from a help function a party, for example, a business partner, an employee, a company, an organizational center, etc., or a geographic location on a user interface; and/or 2) depend upon the ERP system to automatically derive master data object instance data automatically. For example, once an account is entered into a sales order, the ship-to address, bill-to address, sales unit, and employee responsible are automatically determined.

Determination of a most suitable address for a master data object instance referred to by a BTD, however, is a complex task, which depends heavily on business logic and modelling. For example:

A business partner, MyPC, has two delivery addresses, the main delivery address in Frankfurt and a second delivery address in Heidelberg. MyPC also has a billing address in Hamburg. If MyPC is entered as a bill-to party in a sales order, the address in Hamburg should be defaulted. On the other hand, if MyPC is entered as ship-to in the sales order, then the address in Frankfurt should be defaulted.

Employee Kate Jacob works in the London Office of Akron Heating and has an employee workplace address. Kate is also a customer of Akron Heating and gets deliveries to her home address in Reading. If Kate is entered as employee responsible in a service order, then the address in London should be defaulted. However, if Kate is entered as the account in the service order, then the address in Reading should be defaulted.

Consultant Frank Burns is a contact for Metal, Inc. in Birmingham as well as for Car Manufacturer, Inc. in London. Frank has work places at both companies. If a business document is created for Metal, Inc. then the Birmingham relationship address should be taken into account How to find the most suitable address depends on:

The available addresses. For example, the addresses of MyPC, Kate, or Frank.

The party role. For example, MyPC is either used as "bill-to" or as "ship-to" in the sales order.

A relationship partner. For example, whether the business document with Frank as a contact has Metal, Inc. or Car Manufacturer, Inc. as an account.

The validity date of the address to find. For example, a business partner can move on Dec. 31, 2012 to another city.

If the process is within a corporate group or with an external party.

Address usages. For example, one of the addresses of MyPC can be indicated as "billing address."

Determining the most suitable address can be quite complex. In some implementations, for example, for a bill-to party:

If the partner is an Employee: if there is an Employee Workplace Address, take this.

Else if there is a default contact relationship address with the relationship party, take this Else if there is an address of the partner with the address usage "For invoices to invoice recipient," take this Else if there is any other address of the business partner, take this.

The knowledge about the address determination sequence is business knowledge, since it is related to the business processes of the applications. In some implementations, a service consumer may simply provide the context information, for example a location and/or a validity date, and how the master data object instance is supposed to be used in the BTD, for example as "bill-to".

Figure 4:
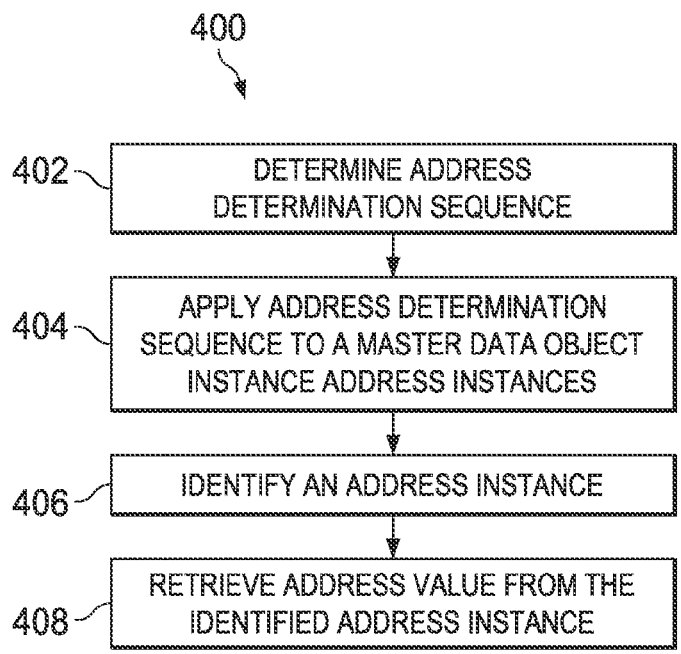
FIG. 4 is a flowchart illustrating an example method for determining a most suitable address for a master data object instance for a given usage in a business transaction document, master data object, or business process.

FIG. 4 is a flowchart illustrating an example method 400 for determining a most suitable address for a master data object instance for a given usage in a business transaction document. For clarity of presentation, the description that follows generally describes method 200 in the context of FIG. 1. However, it will be understood that method 400 may be performed, for example, by any other suitable system, environment, software, and hardware, or a combination of systems, environments, software, and hardware as appropriate.

Referring now to FIG. 4, method 400 begins at 402. At 402, the address determination sequence is determined. The address determination sequence may depend upon filter parameter(s) provided by a user through the address defaulting service. For example, if the filter parameter specified "party role=ship-to", the address determination sequence would be determined to, for a particular MDO type associated with an application business process, identify the address that best corresponds to the user-provided filter parameter of "party role=ship-to." From 402, method 400 proceeds to 404.

At 404, the address determination sequence is applied to an MDO instance address instances. In some implementations, the application of the address determination sequence returns a reference to an MDO instance address instance and/or a reference to an address snapshot instance derived from an MDO instance address instance. In some implementations, the reference can be a unique reference value. In some implementations, the address instance can be contained within the MDO instance. In other implementations, the address instance can be stored remotely from the MDO instance in, for example, a data structure, a file, a database, etc. From 404, method 400 proceeds to 406.

At 406, an address is identified. In some implementations, the address snapshot instance is identified by using an association provided by a unique reference value associated with the address instance determined as containing the most suitable address for an MDO instance. In some implementations, the unique reference value can be contained within the address instance. In other implementations, the unique reference value can be stored remotely from the address instance in, for example, a data structure, a file, a database, etc. From 406, method 400 proceeds to 408.

At 408, the address value is optionally retrieved from the identified address snapshot instance. From 408, method 400 stops.

Figure 5:
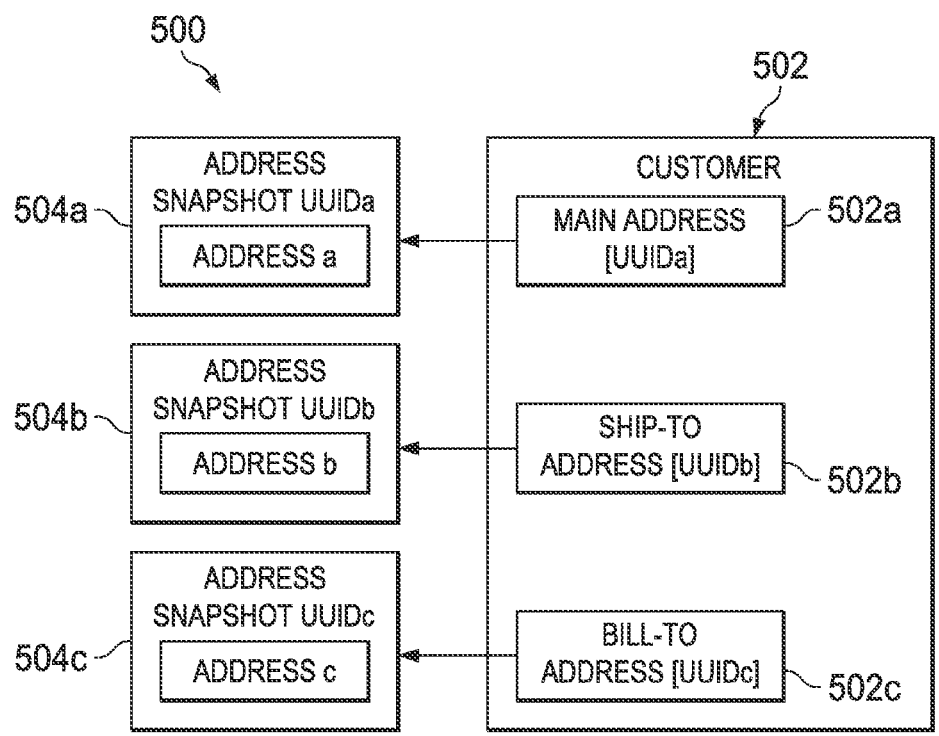
FIG. 5 is a block diagram illustrating a master data object instance and associated address snapshot instances.

Referring now to FIG. 5, FIG. 5 is a block diagram illustrating an MDO 502 instance, here a customer. Also illustrated are MDO 502 instance address instances 502a-502c with unique reference values to associated address snapshot 504a-504c instances, respectively. Each address snapshot instance 504a-504c also contains data fields with address data values, here in the example illustrated for sake of simplicity "Address a", "Address b", and "Address c", respectively. While illustrated to use UUID values, any unique reference value may be used to associate address instances to address snapshot instances. While illustrated that UUID values are stored within address instances 502a-502c and address snapshot 504a-504c instances, the UUID value may be stored remotely to the address instances 502a-502c and the address snapshot 504a-504c instances. While illustrated that address data values are stored within address snapshot 504a-504c instances, the address data values may be stored remotely from the address snapshot 504a-504c instances.

To clarify an implementation of method 400 (as illustrated by FIG. 4) with reference to FIG. 5, if a filter parameter supplied by a user through the suitable address service is "party role=ship-to", the address determination sequence for a CUSTOMER-type MDO would in some implementations determine that the "Ship-To Address" would be the most suitable data value. Next, at 404, the "Ship-To Address" 502b address instance would be determined as containing the most suitable address for the customer MDO 502 instance. Next, at 406, the UUID value, here "UUIDb", identifying the associated address snapshot 504b instance would be determined. Finally, at 408, the address value in the address snapshot 504b instance, here "Address b" could be optionally retrieved.

Distinction between correction and change of addresses

Figure 6:
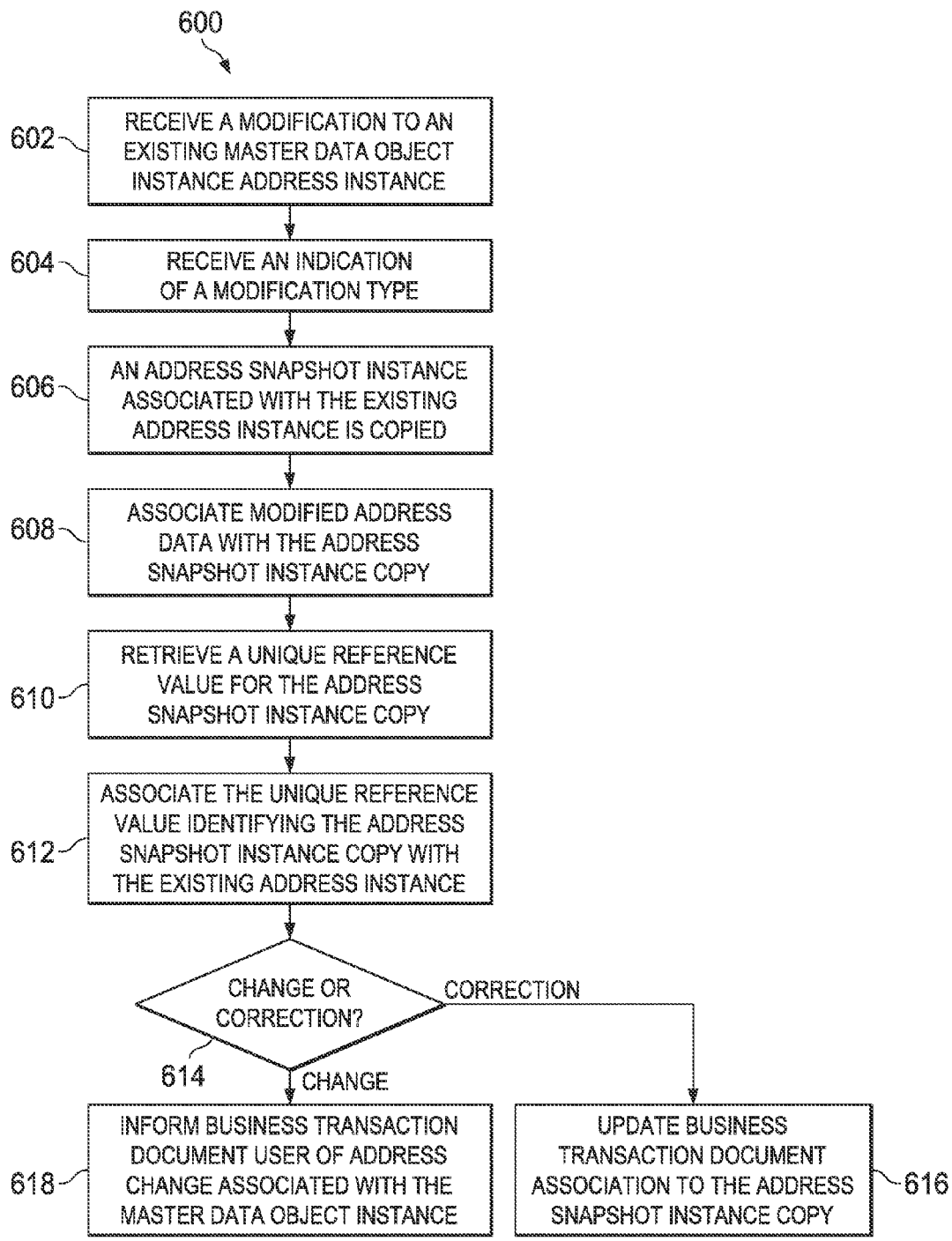
FIG. 6 is a flowchart illustrating an example method for distinguishing between a correction and a change in address data for a master data object instance.

FIG. 6 is a flowchart illustrating an example method for distinguishing between a correction and a change in address data for a MDO instance. For clarity of presentation, the description that follows generally describes method 600 in the context of FIG. 1. However, it will be understood that method 600 may be performed, for example, by any other suitable system, environment, software, and hardware, or a combination of systems, environments, software, and hardware as appropriate.

Referring now to FIG. 6, method 600 begins at 602. At 602, a modification to address data associated with an existing MDO instance address instance is received. From 602, method 600 proceeds to 604.

At 604, an indication of a modification type is received. In some implementations, the modification type indicates whether the MDO address data modification is a change or a correction. In some implementations, the indication may be a message, flag, binary value, GUI input, or other suitable indication. From 604, method 600 proceeds to 606.

At 606, an address snapshot instance associated with the existing address instance is copied. From 606, method 600 proceeds to 608.

At 608, the modified address data is associated with the address snapshot instance copy. In some implementations, the modified address data is written to an address instance within the address snapshot instance copy. In other instances the modified address data can be stored remotely from the address snapshot instance copy, for example within a data structure, a file, a database, etc. From 608, method 600 proceeds to 610.

At 610, a unique reference value for the address snapshot instance copy is retrieved. In some implementations, the unique reference value for the address snapshot instance copy is retrieved from the address snapshot instance copy. In other implementations, the unique reference value for the address snapshot instance copy is retrieved from a location remote to the address snapshot instance copy, for example within a data structure, a file, a database, etc. From 610, method 600 proceeds to 612.

At 612, the unique reference value identifying the address snapshot instance copy is associated with the existing address instance of the MDO instance. In some implementations, the unique reference value is written to the existing address instance within the MDO instance. In other instances the unique reference value can be stored remotely from the existing address instance, for example within a data structure, a file, a database, etc. From 612, method 600 proceeds to 614.

At 614, a determination is made whether the modifications to the MDO instance address data was a change or a correction. If the modifications to the MDO instance address data is determined to be a correction, method 600 proceeds to 616. At 616, any corresponding BTD address instance that refers to the address snapshot prior to the MDO address data modification is updated to refer to the address snapshot instance copy. From 616, method 600 stops.

If at 614, however, the modifications to the MDO instance address data is determined to be a change, method 600 proceeds to 618. At 618, a message is transmitted to users of any corresponding BTD that referred to the address snapshot prior to the MDO address data change informing that address data referred to by the BTD is potentially outdated. In some implementations, the message can be an email, text message, popup window, audio or video indicator, or other suitable message. In some implementations, the transmitted message is received by a UsedAddress TO associated with any corresponding BTD. From 618, method 600 stops.

In some implementations, an address instance of a master data object can be used in business transaction documents and other master data objects. For example, a business partner address in an Installed Base MDO (e.g. representing a power plant) may represent another MDO instance.

In an alternate implementation, a UsedAddress TO is not used by a document 117 instance to create new snapshot 115 instances on the addition or change of an address instance in the document 117 instance. Instead, the document 117 instance may, similar to an MDO 114 instance, create an address snapshot 115 instance without the use of the UsedAddress TO.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   storing, by a computer, a master data object instance, wherein the master data object instance comprises of a plurality of address instances each with one or more address data;
   generating, by the computer, a particular address snapshot instance for a respective particular address instance of the plurality of address instances, wherein the particular address snapshot instance is associated with the respective particular address instance through a respective unique address snapshot reference value, and the particular address snapshot instance is a data structure that comprises a root node with the respective unique address snapshot reference value, a node hosting address data of the respective particular address instance from which the particular address snapshot instance was generated, a validity period of a source object for which the particular address snapshot instance was generated, and a display name node containing a semantic name for an entity associated with the particular address snapshot instance that is filled in all address snapshot instances;
   saving, by the computer, the particular address snapshot instance in a data storage following association with address data of the respective particular address instance;
   rendering, by the computer, the particular address snapshot instance as immutable;
   determining, by the computer, an address determination sequence;
   analyzing, by the computer, the address determination sequence to the master data object instance to identify one or more address instances including the respective particular address instance;
   identifying, by the computer, the respective particular address instance as a most suitable address instance from among the one or more address instances based on criteria of the address determination sequence;
   returning, by the computer, the unique address snapshot reference value from the most suitable address instance; and
   identifying, by the computer, the particular address snapshot instance from the returned unique address snapshot reference;
   retrieving, by the computer, the address data from the particular address snapshot instance using the unique address snapshot reference value.

2. The computer-implemented method of claim 1, wherein the address determination sequence includes at least one address determination rule.

3. The computer-implemented method of claim 2, wherein the at least one address determination rule is followed in a predetermined, prioritized order determined by application knowledge related to at least one process performed by a software application.

4. The computer-implemented method of claim 1, wherein the address determination sequence depends upon at least one received filter parameter.

5. The computer-implemented method of claim 4, wherein the at least one received filter parameter includes at least one of a party role, a location role, or a validity date.

6. The computer-implemented method of claim 1, wherein the unique address snapshot reference value is stored with the respective particular address instance.

7. The computer-implemented method of claim 1, wherein the unique address snapshot reference value is stored remotely in relation to the respective particular address instance.

8. The computer-implemented method of claim 1, wherein the particular address snapshot instance is rendered as immutable following the saving of the particular address snapshot instance in the data storage.

9. A computer-program product comprising a tangible, non-transitory media storing computer-readable instructions, the instructions operable when executed by a processor to:
  store a master data object instance, wherein the master data object instance comprises of a plurality of address instances each with one or more address data;
  generate a particular address snapshot instance for a respective particular address instance of the plurality of address instances, wherein the particular address snapshot instance is associated with the respective particular address instance through a respective unique address snapshot reference value, and the particular address snapshot instance is a data structure that comprises a root node with the respective unique address snapshot reference value, a node hosting address data of the respective particular address instance from which the particular address snapshot instance was generated, a validity period of a source object for which the particular address snapshot instance was generated, and a display name node containing a semantic name for an entity associated with the particular address snapshot instance that is filled in all address snapshot instances;
  save the particular address snapshot instance in a data storage following association with address data of the respective particular address instance;
  render the particular address snapshot instance as immutable;
  determine an address determination sequence;
  analyze the address determination sequence to the master data object instance to identify one or more address instances including the respective particular address instance;
  identify the respective particular address instance as a most suitable address instance from among the one or more address instances based on criteria of the address determination sequence;
  return the unique address snapshot reference value from the most suitable address instance; and
  identify the particular address snapshot instance from the returned unique address snapshot reference;
  retrieve the address data from the particular address snapshot instance using the unique address snapshot reference value.

10. The computer-program product of claim 9, wherein the address determination sequence includes at least one address determination rule.

11. The computer-program product of claim 10, wherein the at least one address determination rule is followed in a predetermined, prioritized order determined by application knowledge related to at least one process performed by a software application.

12. The computer-program product of claim 9, wherein the address determination sequence depends upon at least one received filter parameter.

13. The computer-program product of claim 9, wherein the unique address snapshot reference value is stored with the respective particular address instance.

14. A computer system, comprising:
  computer memory configured to store a master data object instance; and
  at least one hardware processor interoperably coupled to the memory and configured to:
    store the master data object instance, wherein the master data object instance comprises of a plurality of address instances each with one or more address data;
    generate a particular address snapshot instance for a respective particular address instance of the plurality of address instances, wherein the particular address snapshot instance is associated with the respective particular address instance through a respective unique address snapshot reference value, and the particular address snapshot instance is a data structure that comprises a root node with the respective unique address snapshot reference value, a node hosting address data of the respective particular address instance from which the particular address snapshot instance was generated, a validity period of a source object for which the particular address snapshot instance was generated, and a display name node containing a semantic name for an entity associated with the particular address snapshot instance that is filled in all address snapshot instances;
    save the particular address snapshot instance in a data storage following association with address data of the respective particular address instance;
    render the particular address snapshot instance as immutable;
    determine an address determination sequence;
    analyze the address determination sequence to the master data object instance to identify one or more address instances including the respective particular address instance;
    identify the respective particular address instance as a most suitable address instance from among the one or more address instances based on criteria of the address determination sequence;
    return the unique address snapshot reference value from the most suitable address instance; and
    identify the particular address snapshot instance from the returned unique address snapshot reference;
    retrieve the address data from the particular address snapshot instance using the unique address snapshot reference value.

15. The system of claim 14, wherein the address determination sequence includes at least one address determination rule.

16. The system of claim 15, wherein the at least one address determination rule is followed in a predetermined, prioritized order determined by application knowledge related to at least one process performed by a software application.

17. The system of claim 14, wherein the address determination sequence depends upon at least one received filter parameter.

18. The system of claim 14, wherein the unique address snapshot reference value is stored with the respective particular address instance.

19. The system of claim 14, wherein the particular address snapshot instance is rendered as immutable following the saving of the particular address snapshot instance in the data storage.

* * * * *